(12) United States Patent
Chen et al.

(10) Patent No.: US 7,357,560 B2
(45) Date of Patent: Apr. 15, 2008

(54) LIGHT GUIDE PLATE LOCATING CONSTRUCTION

(75) Inventors: Chin-Hui Chen, Yangmei Taoyuan (TW); Fang-I Chou, Yangmei Taoyuan (TW)

(73) Assignee: K-Bridge Electronics Co., Ltd., Yangmei Taoyuan (TW)

( * ) Notice: Subject to any disclaimer, the term of this patent is extended or adjusted under 35 U.S.C. 154(b) by 0 days.

(21) Appl. No.: 11/526,077

(22) Filed: Sep. 25, 2006

(65) Prior Publication Data

US 2007/0211495 A1    Sep. 13, 2007

(30) Foreign Application Priority Data

Mar. 8, 2006    (TW) .............................. 95203833 U

(51) Int. Cl.
*F21V 7/04*    (2006.01)

(52) U.S. Cl. ......................................... 362/633; 349/58

(58) Field of Classification Search ................ 362/633; 349/58
See application file for complete search history.

(56) References Cited

U.S. PATENT DOCUMENTS 5,211,464 A * 5/1993 Bohmer ...................... 362/634
5,688,035 A * 11/1997 Kashima et al. ............. 362/609
5,788,356 A * 8/1998 Watai et al. ................. 362/621
6,545,732 B2 * 4/2003 Nakano ........................ 349/58
6,742,906 B2 * 6/2004 Matsushita .................. 362/615
6,811,276 B2 * 11/2004 Moon .......................... 362/600
7,083,317 B2 * 8/2006 Higashiyama ............... 362/612
7,086,774 B2 * 8/2006 Katsuda et al. ............. 362/634
7,226,199 B2 * 6/2007 Shimizu et al. ............. 362/609
7,267,472 B2 * 9/2007 Shiau et al. ................. 362/633

* cited by examiner

*Primary Examiner*—Hargobind S. Sawhney
(74) *Attorney, Agent, or Firm*—Troxell Law Office, PLLC

(57) ABSTRACT

A light guide plate locating construction includes a frame containing a mask and light tube with the light guide plate mounted at the open end of the mask; light permeating through one side of the light guide plate to project in the anticipated direction; locating holes being disposed at the top of the opening end of the mask; a retainer being inserted into the hole; the retainer including a locating portion and an interfering portion extending from the locating portion to the open end of the mask to hold against the edge of the light guide plate to protect the tube from being hit by the light guide plate.

2 Claims, 7 Drawing Sheets

LIGHT GUIDE PLATE LOCATING CONSTRUCTION

BACKGROUND OF THE INVENTION (a) Field of the Invention

The present invention is related to a light guide plate locating construction, and more particularly, to one that is applied in a backlight unit to locate the light guide plate in position so to protect light tubes from being hit by the light guide plate.

(b) Description of the Prior Art

LED applied in an information system may be adapted with a direct or side type of backlight unit configuration depending on the design requirements. FIG. 1 of the accompanying drawings shows a schematic view of a basic construction of a side type backlight unit configuration. Wherein, a backlight unit 1 includes a light guide plate 11, a tube 12 and a mask 13. The mask 13 is made of hard metal material and the tube 12 is clad in the mask 13 to facilitate the mounting of the mask on one end side of the light guide plate 11 to take advantage of the mask 13 as an aid to reflect streams of light, thus to guide massive streams of light emitted from the tube 12 into the light guide plate 11. Streams of light passing through the light guide 1 are upwardly directed to leave the backlight unit 1.

The sideway section of the mask 13 is made in a shape of ⊏ to define a top 131, a side 132, and a bottom 133. To prevent the edge of the light guide plate 11 from sliding into the mask 13 to hit and break the tube 12, a ⊓shaped opening is cut from bottom 133 of the mask 13 so to define on the bottom 133 a flat part having its one side connected and the other three sides cut through. The flat part is raised by its three sides to define a retaining part 15 and the longer the cut is, the larger the ⊓shaped opening gets. However, the construction for the retaining part 15 is found with the following flaws:

1. The height of the retaining part 15 is limited for facilitating the installation of the tube 12 and the light guide plate 11, also for avoiding excessively greater opening of the mask to affect its effect of reflecting the light; meanwhile, the effect of preventing the light guide plate 11 from hitting the tube 12 is compromised.

2. The retaining part 15 is formed by cutting and pushing up a portion of the bottom 133 of the mask and is connected to only one side of the bottom 133 is vulnerable to deformation thus to fail its purpose of preventing the light guide plate 11 form hitting the tube 12 due to that the retaining part is always subject to side push by the light guide plate 15 and gets fatigue and that it can get easily bent by the push force from the light guide plate.

SUMMARY OF THE INVENTION

The primary purpose of the present invention is to provide an improved light guide plate locating construction to solve the problem of effectively preventing the light guide plate from hitting the tube found with the prior art by firmly locating the light guide plate and effectively interring the edge of the light guide plate to protect the tube from being hitting and broken by the light guide plate.

To achieve the purpose, a mask and a tube are provided to a frame while the light guide plate is mounted at the opening end of the mask; light is permeating through one side of the light guide plate to project in the anticipated direction; a locating holes is disposed at the top of the opening end of the mask; a retainer is inserted into the hole; and the retainer includes a locating portion to be inserted into the hole and an interfering portion extending from the locating portion to the open end of the mask to hold against the edge of the light guide plate.

DETAILED DESCRIPTION OF THE PREFERRED

Embodiments

Figure 1:
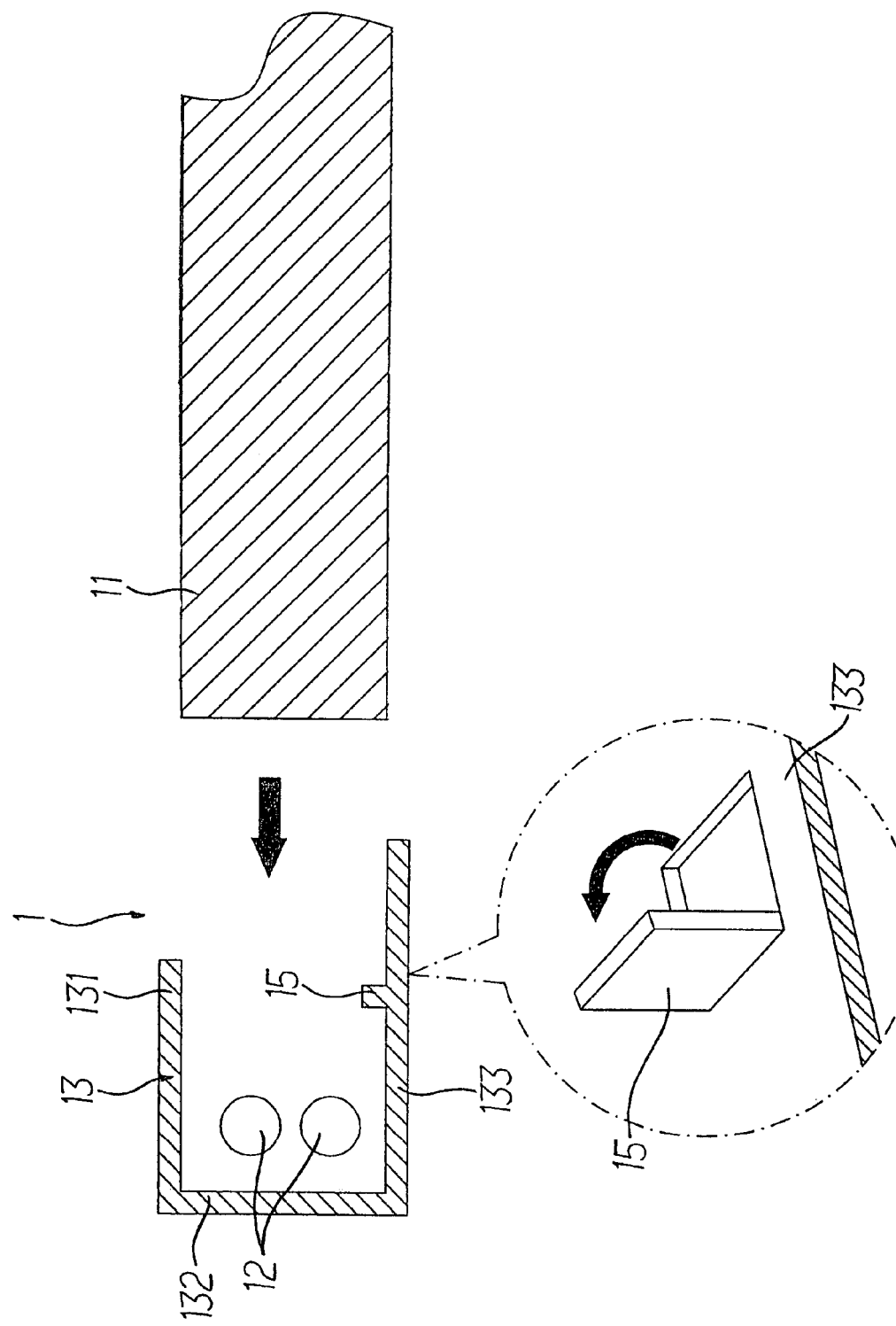
FIG. 1 is a schematic view showing a construction of a backlight unit of the prior art.
Figure 2:
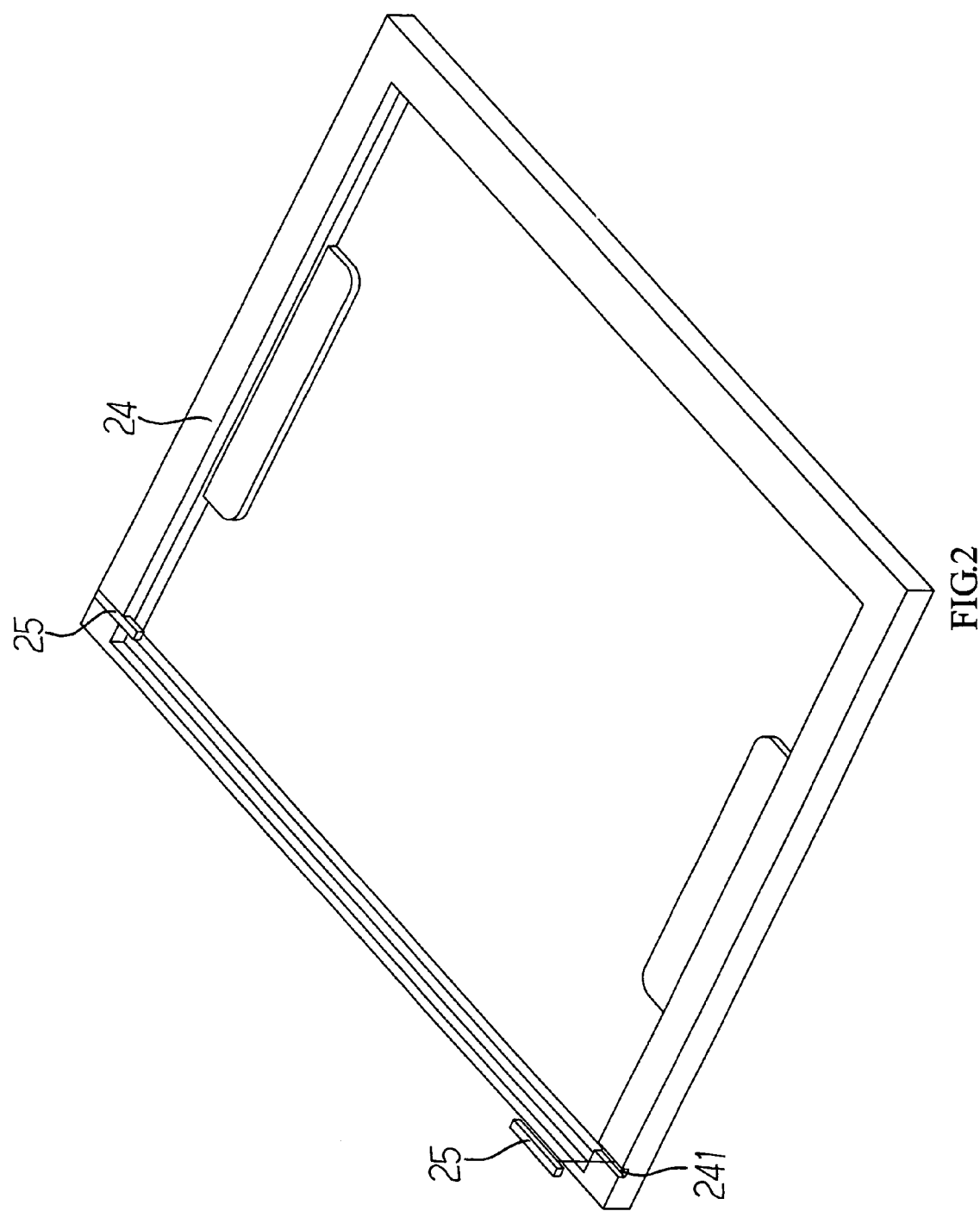
FIG. 2 is a perspective view showing a construction of a locating hole of the present invention.
Figure 3:
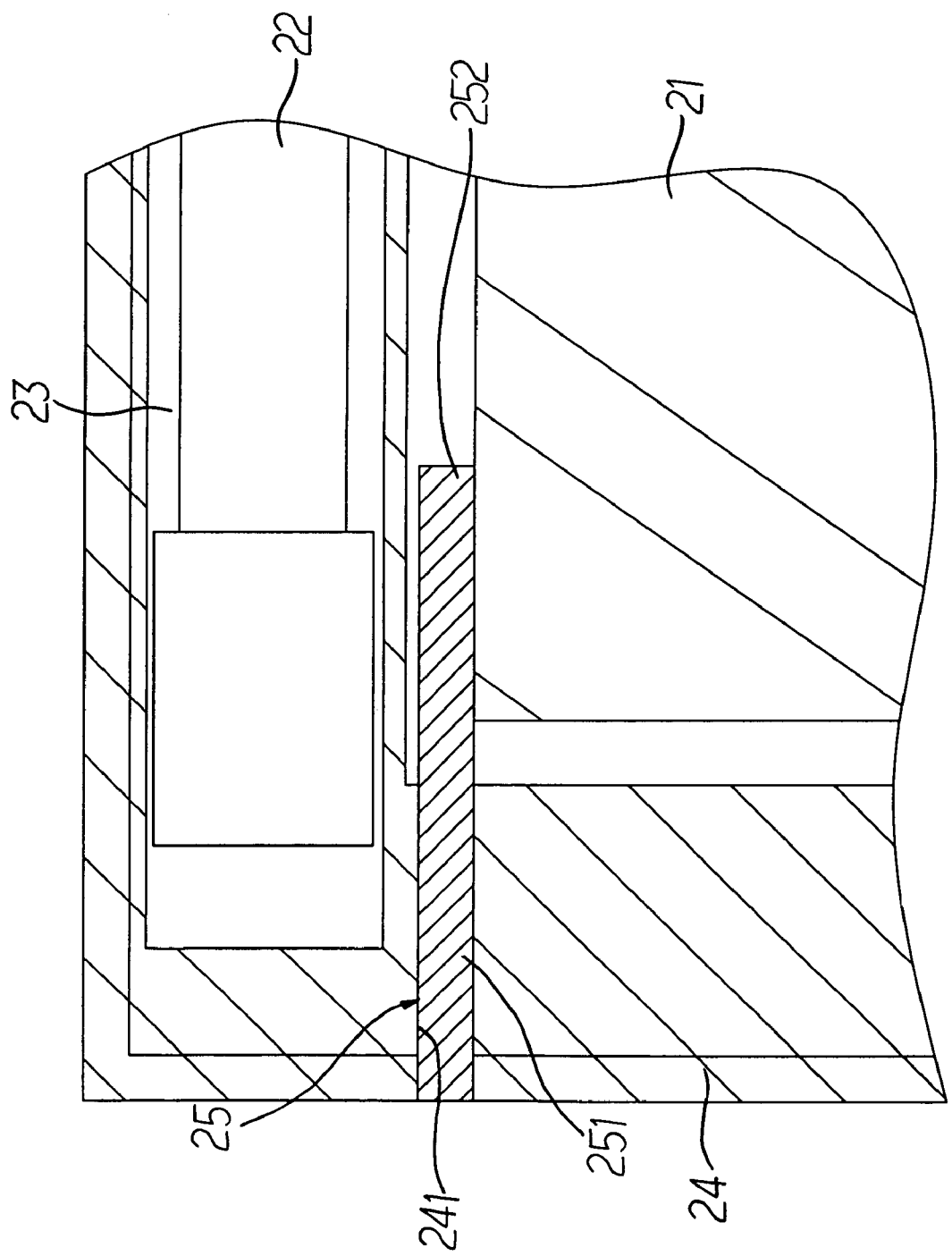
FIG. 3 is a schematic view of the retainer in the first preferred embodiment of the present invention.

Referring to FIGS. 2 and 3 respectively showing views of a basic configuration and application in the display of a backlight unit of a light guide plate locating construction of the present invention, a mask 23 and a tube 22 are disposed in a frame 24. A light guide plate 21 is mounted to an opening end of the mask 23. The frame is mounted downward from the light guide plate 21 and the topside of the mask 23. Streams of light emitted from the tube 22 enter into one side of the light guide plate 21 and are projected in the anticipated direction for providing display effects by the backlight unit.

A locating hole 241 is disposed on the frame 24 at where near the opening end of the mask 23. The locating hole 241 is disposed on topside of the frame 24 to receive insertion in position by a retainer 25 as illustrated in the preferred embodiment. The retainer 25 includes a locating portion 251 and an interfering portion 252. When assembled as illustrated in FIGS. 2 and 3, the retainer 25 is placed from the topside of the frame 24. The locating portion 251 extends into the locating hole 241 for the retainer 25 and the frame 24 to be secured to each other. The interfering portion 252 extends facing the opening end of the mask 23 so to get secured in position by holding against an edge of the light guide plate 21 for protecting the tube 22 from being hit and broken by the light guide plate 21. The locating hole 241 may be disposed to the side of the frame 24 as illustrated in FIG. 4 and the retainer 25 is inserted into the locating hole from the side of the frame 24.

Figure 4:
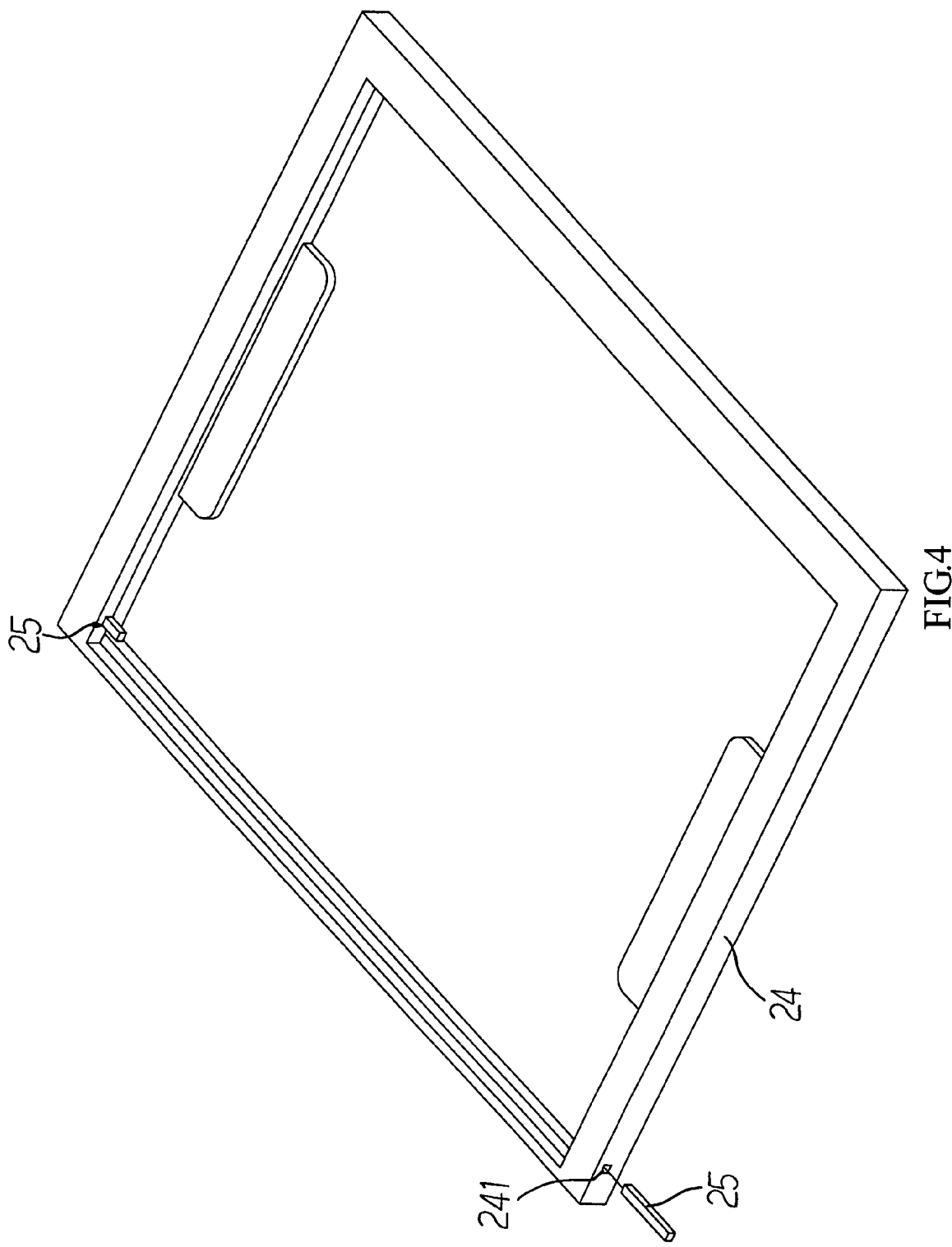
FIG. 4 is a perspective view showing a construction of a locating hole of the present invention.
Figure 5:
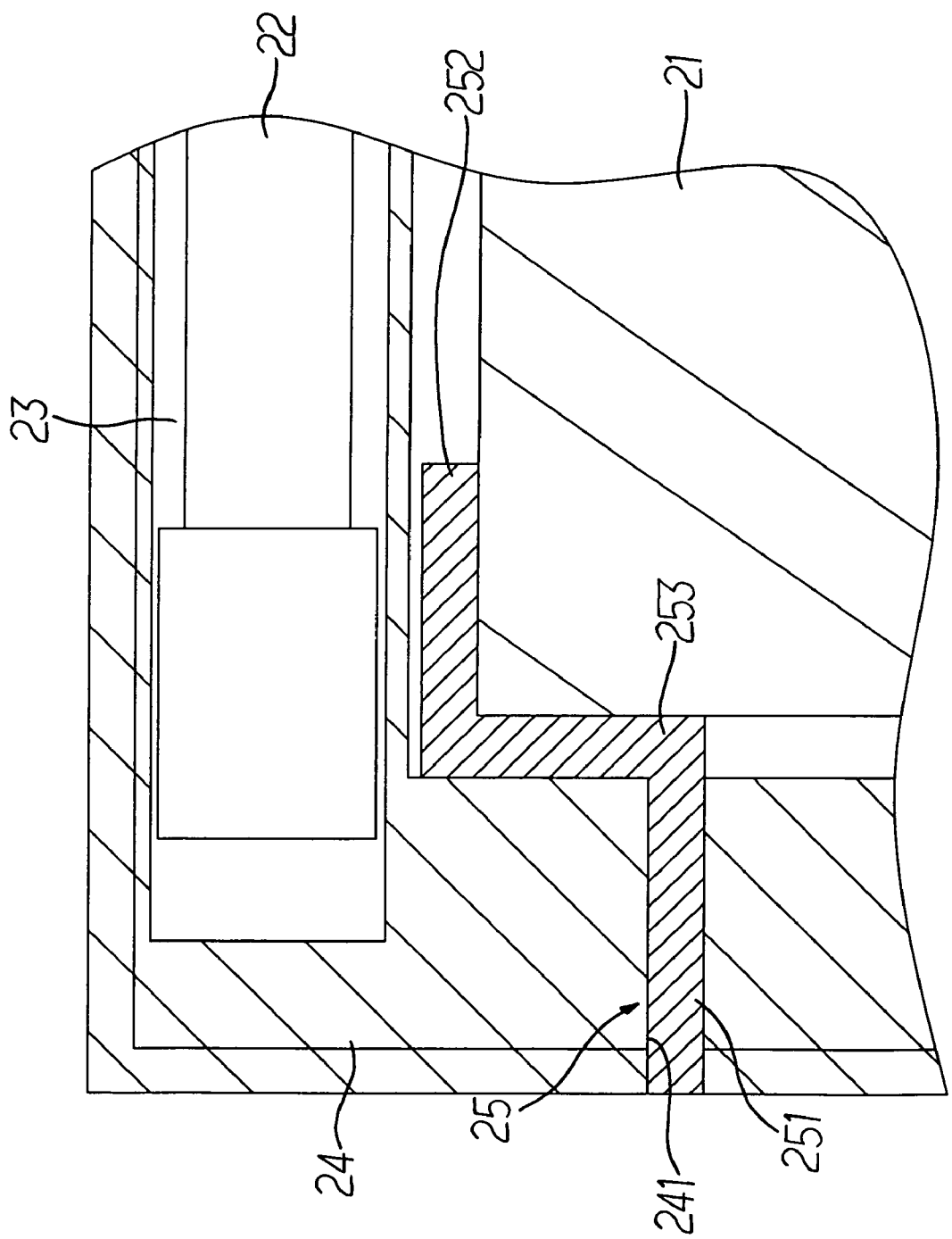
FIG. 5 is a schematic view of a retainer in a second preferred embodiment of the present invention.
Figure 6:
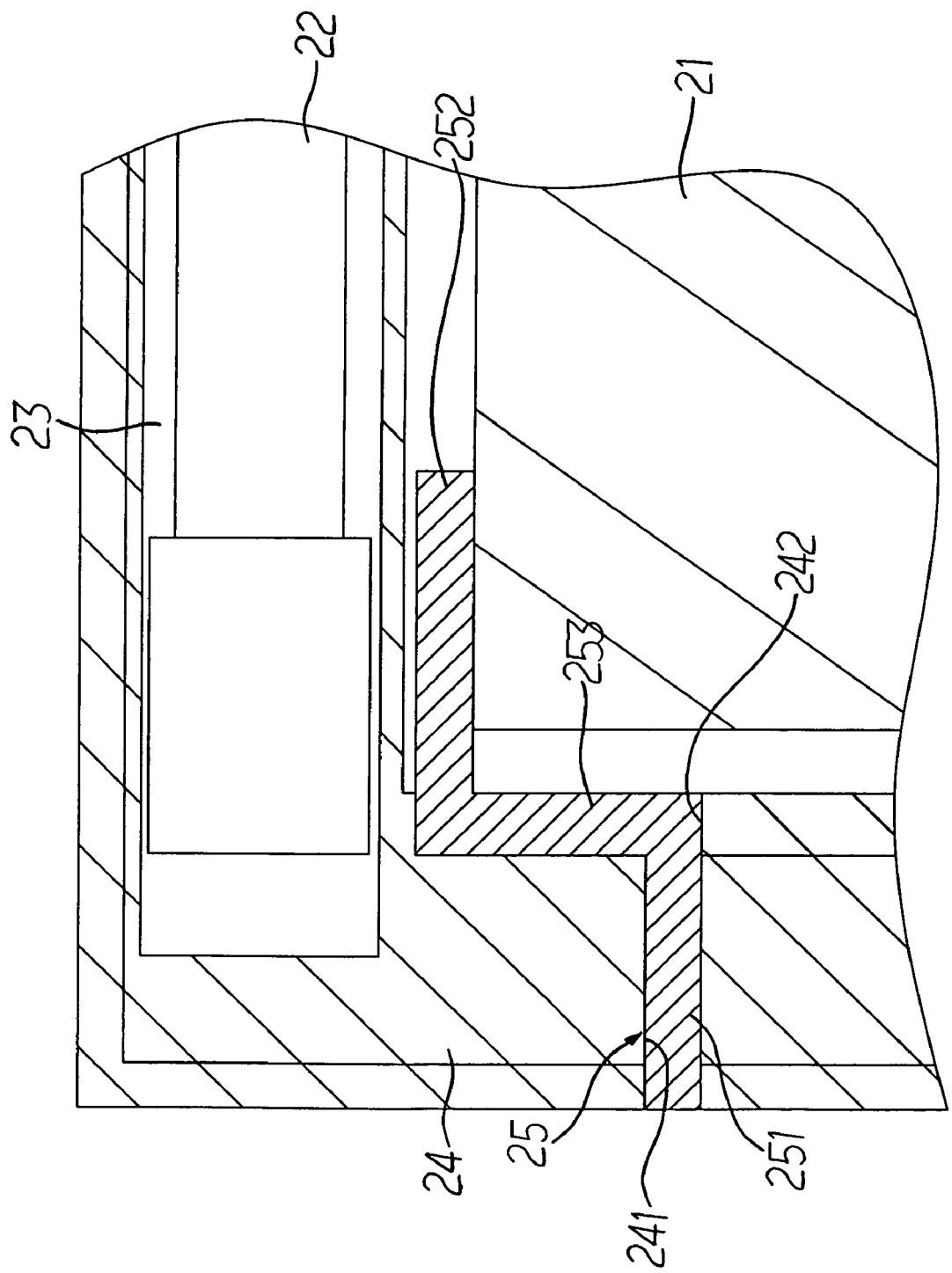
FIG. 6 is a schematic view of a retainer in a third preferred embodiment of the present invention.

Now referring to FIG. 4 for a second preferred embodiment of the retainer in the present invention, the retainer 25 further includes a connecting portion 253 to connect the locating portion 251 and the interfering portion 252. Upon assembling, the locating portion 251 extends into the locating hole. The connecting portion 253 is disposed by extending in parallel with the inner side of the frame 24 up to the opening end of the mask 23 and extends facing the mask 23 further to form the interfering portion 252 to hold against and secure in the edge of the light guide plate 21. A slotted hole 242 may be further created on the frame 24 to accommodate the connecting portion 253 in a third preferred embodiment as illustrated in FIG. 6.

Figure 7:
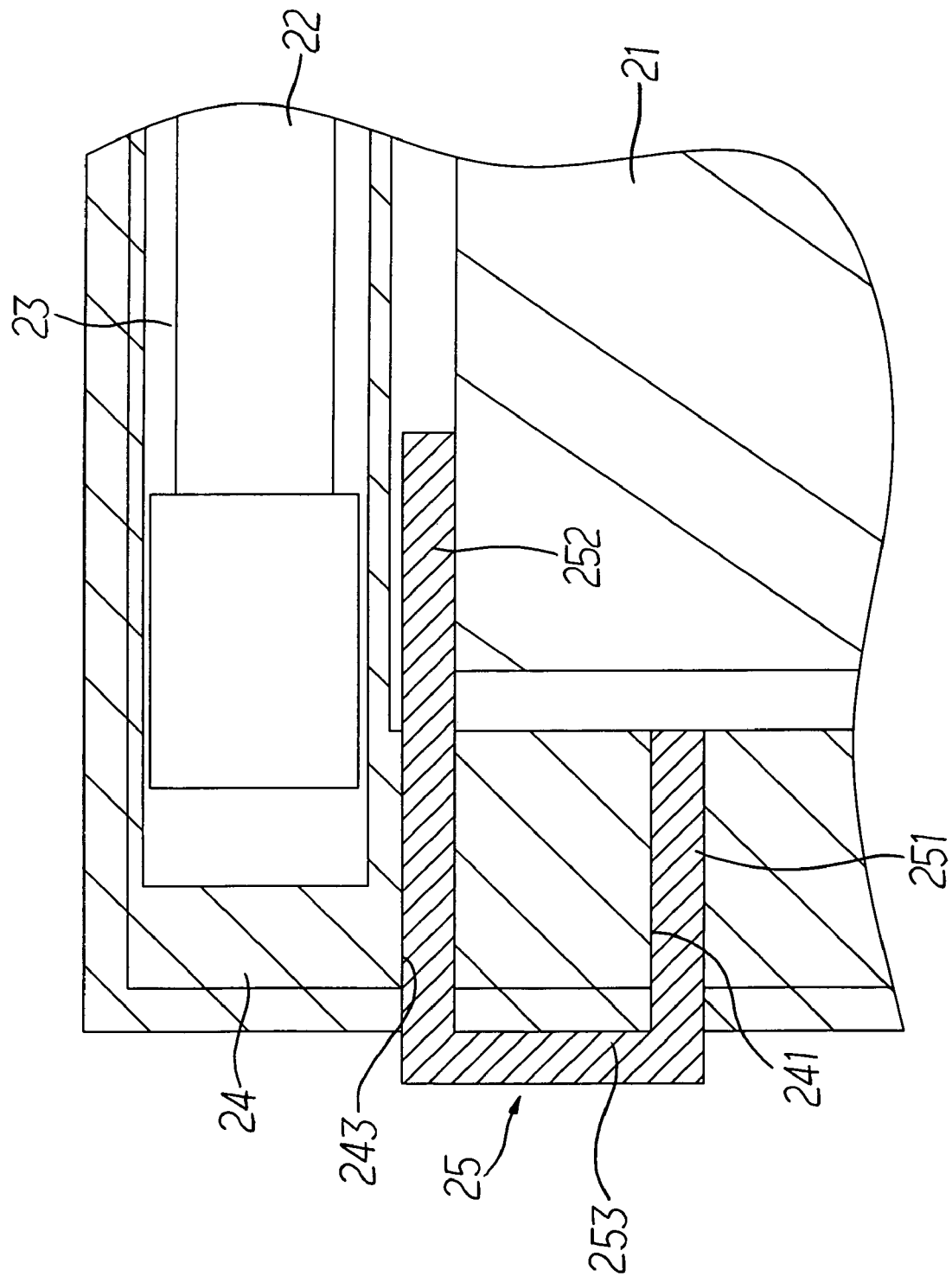
FIG. 7 is a schematic view of a retainer in a fourth preferred embodiment of the present invention.

As illustrated in FIG. 7 for a fourth preferred embodiment of the present invention of the retainer 25, a through hole is further disposed on one side of the locating hole 241. Upon assembling, the locating portion 251 extends into the locating hole. The connecting portion 253 extend along and in parallel with the outer side of the frame 24 up to where the through hole 243 is provided before being curved to extend into the through hole 243 to connected to the interfering portion 252. Again, the interfering portion 252 is secured in position by holding against the edge of the light guide plate 21.

It is to be noted that the retainer is separately provided to the frame that is separated from the frame. Therefore, the retainer can be designed for much longer. All the preferred embodiments described above have the retainer secured to the frame and the interfering portion extends to penetrate into the mask to secured the assembly of the light guide plate to allow easy assembly. The much longer retainer is reliable to stop the light guide plate from hitting the tube. Furthermore, the retainer is inserted into the locating hole by its locating portion. The locating hole and the locating portion may be attached to each other by adhesion to improve the assembly strength between the retainer and the frame to avoid the retainer from being deformed due to long-term subject to the sideway push force applied by the light guide plate.

The prevent invention provides an improved construction of locating a light guide plate, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

We claim:

1. A light guide plate locating construction includes a frame, a mask and a tube being disposed in the frame; a light guide plate being mounted at an opening end of the mask; streams of light emitted from the tube penetrating through the light guide plate and projected in the anticipated direction; a locating hole being disposed on the frame at where near to the opening end of the frame; a retainer being inserted and secured in the locating hole; the retainer including a locating portion and an interfering portion; the locating portion extending into the locating hole; the interfering portion extending from the locating portion facing the opening end of the mask; and the interfering portion holding against an edge of the light guide plate, wherein the locating portion and the interfering portion of the retainer are connected to each other by means of a connection portion, wherein the connecting portion is disposed in parallel with the frame and a slotted hole is disposed on the frame to accommodate the connecting portion.

2. A light guide plate locating construction includes a frame, a mask and a tube being disposed in the frame; a light guide plate being mounted at an opening end of the mask; streams of light emitted from the tube penetrating through the light guide plate and projected in the anticipated direction; a locating hole being disposed on the frame at where near to the opening end of the frame; a retainer being inserted and secured in the locating hole; the retainer including a locating portion and an interfering portion; the locating portion extending into the locating hole; the interfering portion extending from the locating portion facing the opening end of the mask; and the interfering portion holding against an edge of the light guide plate, wherein a through hole is disposed to one side of the locating hole; the retainer having its locating portion to enter into the locating hole; an extension part being formed along the frame with its connecting portion up to where the through hole is disposed before being curved to penetrate into the through hole to connect to the interfering portion.

* * * * *